(12) United States Patent
Apfel

(10) Patent No.: US 7,511,930 B2
(45) Date of Patent: Mar. 31, 2009

(54) SYSTEM AND METHOD FOR HIGH VOLTAGE PROTECTION OF POWERED DEVICES

(75) Inventor: Russell J. Apfel, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 69 days.

(21) Appl. No.: 11/473,994

(22) Filed: Jun. 23, 2006

(65) Prior Publication Data

US 2007/0263333 A1 Nov. 15, 2007

Related U.S. Application Data

(63) Continuation of application No. 11/433,221, filed on May 11, 2006.

(51) Int. Cl.
*H02H 3/00* (2006.01)
*H02H 1/00* (2006.01)

(52) U.S. Cl. ...................................................... 361/55

(58) Field of Classification Search .................. 361/54, 361/55, 56, 91.5
See application file for complete search history.

(56) References Cited

U.S. PATENT DOCUMENTS

| | | | | |
|---|---|---|---|---|
| 3,163,814 A * | 12/1964 | Todd | ............................ | 323/270 |
| 3,371,262 A * | 2/1968 | Bird et al. | ....................... | 363/53 |
| 3,982,173 A * | 9/1976 | Berry et al. | .................. | 323/236 |
| 4,644,437 A | 2/1987 | Robe | | |
| 5,274,262 A * | 12/1993 | Avery | .......................... | 257/362 |
| 5,325,315 A | 6/1994 | Engel et al. | | |
| 5,485,024 A * | 1/1996 | Reay | ............................ | 257/173 |
| 5,576,557 A | 11/1996 | Ker et al. | | |
| 5,926,383 A | 7/1999 | Pilukaitis et al. | .............. | 363/50 |
| 6,268,639 B1 * | 7/2001 | Li et al. | ........................ | 257/577 |
| 6,295,356 B1 * | 9/2001 | De Nicolo | .................... | 379/413 |
| 6,480,043 B2 | 11/2002 | Hall et al. | ...................... | 327/108 |
| 6,580,591 B2 * | 6/2003 | Landy | ............................ | 361/56 |
| 6,586,317 B1 * | 7/2003 | Vashchenko et al. | ......... | 438/510 |
| 6,636,404 B1 | 10/2003 | Whitney et al. | | |
| 6,909,943 B2 * | 6/2005 | Lehr et al. | .................... | 700/286 |
| 2002/0075619 A1 | 6/2002 | Maytum et al. | | |
| 2003/0206626 A1 | 11/2003 | Scott et al. | | |
| 2003/0213996 A1 | 11/2003 | Van Lieverloo | | |
| 2004/0021178 A1 | 2/2004 | Larson | | |
| 2004/0042141 A1 | 3/2004 | Mikolajczak et al. | | |
| 2004/0052022 A1 | 3/2004 | Laraia | | |
| 2004/0109275 A1 | 6/2004 | Whitney | | |
| 2004/0150929 A1 | 8/2004 | Strayer et al. | | |

(Continued)

*Primary Examiner*—Ronald W Leja
(74) *Attorney, Agent, or Firm*—Westman, Champlin & Kelly, P.A.; R. Michael Reed

(57) ABSTRACT

A powered device includes a rectifier circuit, a logic circuit, and a power protection element. The rectifier circuit includes two inputs to receive an input voltage from a powered network and includes two output terminals to provide a rectified power supply voltage in response to the input voltage. The logic circuit is coupled between the two inputs and adapted to receive data from the powered network. The power protection element is coupled between the two output terminals to protect to the logic circuitry from high power transients. In a first mode of operation, the power protection element presents a high impedance to the two output terminals. In a second mode of operation, the power protection element has a first power protection characteristic. In a third mode of operation, the power protection element has a second power protection characteristic.

27 Claims, 7 Drawing Sheets

U.S. PATENT DOCUMENTS

| | | |
|---|---|---|
| 2004/0195225 A1 | 10/2004 | Thommes |
| 2004/0230846 A1* | 11/2004 | Mancey et al. .............. 713/300 |
| 2004/0257743 A1 | 12/2004 | Chen et al. |
| 2005/0152080 A1 | 7/2005 | Harris et al. |
| 2005/0195540 A1 | 9/2005 | Streibl et al. |
| 2005/0212051 A1 | 9/2005 | Jozwiak et al. |
| 2008/0002318 A1* | 1/2008 | Webb .......................... 361/56 |

* cited by examiner

SYSTEM AND METHOD FOR HIGH VOLTAGE PROTECTION OF POWERED DEVICES

CROSS REFERENCE TO RELATED APPLICATION(S)

This is a continuation application of U.S. patent application Ser. No. 11/433,221, filed on May 11, 2006, and entitled, "SYSTEM AND METHOD FOR HIGH VOLTAGE PROTECTION OF POWERED DEVICES," which is incorporated herein by reference in its entirety.

FIELD OF THE DISCLOSURE

The present disclosure generally relates to Power over Ethernet powered devices, and more particularly, to over-voltage protection circuits within Power over Ethernet devices.

BACKGROUND

Power over Ethernet (PoE) refers to a technique of transmitting electrical power over twisted-pair cabling, along with data, to remote devices in an Ethernet network. PoE as standardized in IEEE 802.3af provides 44 to 57 volts over at least two-pairs of a four-pair cable at a current of up to 350 mA for a guaranteed load power of approximately 15.4 watts. It is also possible to provide power and data over electrical lines, over power buses, and the like. As used herein, the term "powered network" refers to system that delivers power and data on a cable, comprised of one or more wires.

A powered device is an electronic device that is adapted to derive power and to receive data from such a powered network via a cable. A powered device may include a diode bridge to rectify the power supply, one or more transformer windings to isolate internal circuitry, a circuit to protect against transient over-voltage conditions, and other associated circuit components.

In general, the powered devices (PDs) may be exposed to transient high voltage conditions, which may include electrostatic discharge events, transient charges in the cable, and the like. A transient over-voltage condition refers to a high voltage level on the cable, which may be greater than a voltage rating of at least some of the associated circuit components. PoE as standardized in IEEE 802.3af dictates that PDs should be capable of withstanding such high voltage transient conditions, without sustaining high voltage-related damage.

Conventionally, PDs often include an over-voltage protection device that is separate from the integrated circuitry within the PD. In some instances, the over-voltage protection device is a high voltage transient suppressor, such as a high voltage zener diode. A typical external over-voltage protection device is a surface mount transient voltage suppressor that is rated to become active at voltage levels between 64 Volts and 70 Volts with one milliamp of current. Such a transient voltage suppressor typically clamps the supply voltage to a voltage level that is less than the voltage rating of the associated circuit components. In one particular PoE PD, the over-voltage protection device clamps the voltage at a level that is less than 94 Volts for a 4.3 A transient signal.

Unfortunately, the electrical characteristics, ratings and tolerance of the over-voltage protection device also determine the power ratings for other circuit components within the PD. For example, since 94 Volt transients are possible at 4.3 A, any coupled circuitry, such as a power regulator circuit and such as load circuitry, should be rated for a higher power level (e.g. for higher voltage and higher current levels). Unfortunately, this high voltage rating increases costs of the circuits and, consequently, increases PD unit costs.

SUMMARY

In one particular embodiment, a powered device includes a rectifier circuit, a logic circuit, and a power protection element. The rectifier circuit includes two inputs to receive an input voltage from a powered network and includes two output terminals to provide a rectified power supply voltage in response to the input voltage. The logic circuit is coupled between the two inputs and adapted to receive data from the powered network. The power protection element is coupled between the two output terminals to protect to the logic circuitry from high power transients. In a first mode of operation, the power protection element presents a high impedance to the two output terminals. In a second mode of operation, the power protection element has a first power protection characteristic. In a third mode of operation, the power protection element has a second power protection characteristic.

In a particular embodiment, the powered network is a Power over Ethernet (PoE) network, and the powered device is adapted to derive power from the PoE network. In another particular embodiment, the powered network is an electrical power network. In another embodiment, the power protection element further includes active logic to generate a fault protection signal to shut off power to the at least one low-power circuit element when in the third mode of operation.

In another particular embodiment, a method is provided. An input voltage is received from a cable coupled to a powered network at a first input terminal and a second input terminal of an integrated circuit, which includes a voltage protection element and at least one low-power element. The input voltage is rectified using a diode bridge. An over-voltage condition is detected, via the voltage protection element, when the rectified voltage exceeds a threshold voltage. The power to the at least one low-power element is shut off in response to detecting the over-voltage condition.

In another particular embodiment, an integrated circuit of a powered device includes a rectifier circuit, at least one low-voltage circuit, and a voltage protection element. The rectifier circuit includes two input terminals to receive an input supply voltage from a powered network and includes two output terminals to provide a rectified power supply voltage. The at least one low-voltage circuit element is coupled between the two output terminals. The voltage protection element is coupled between the two output terminals. In a first mode of operation, the voltage protection element presents a high impedance to the two output terminals. In a second mode of operation, the voltage protection element has a first over-voltage characteristic. In a third mode of operation, the voltage protection element has a second over-voltage protection characteristic.

DETAILED DESCRIPTION OF THE DRAWINGS

Figure 1:
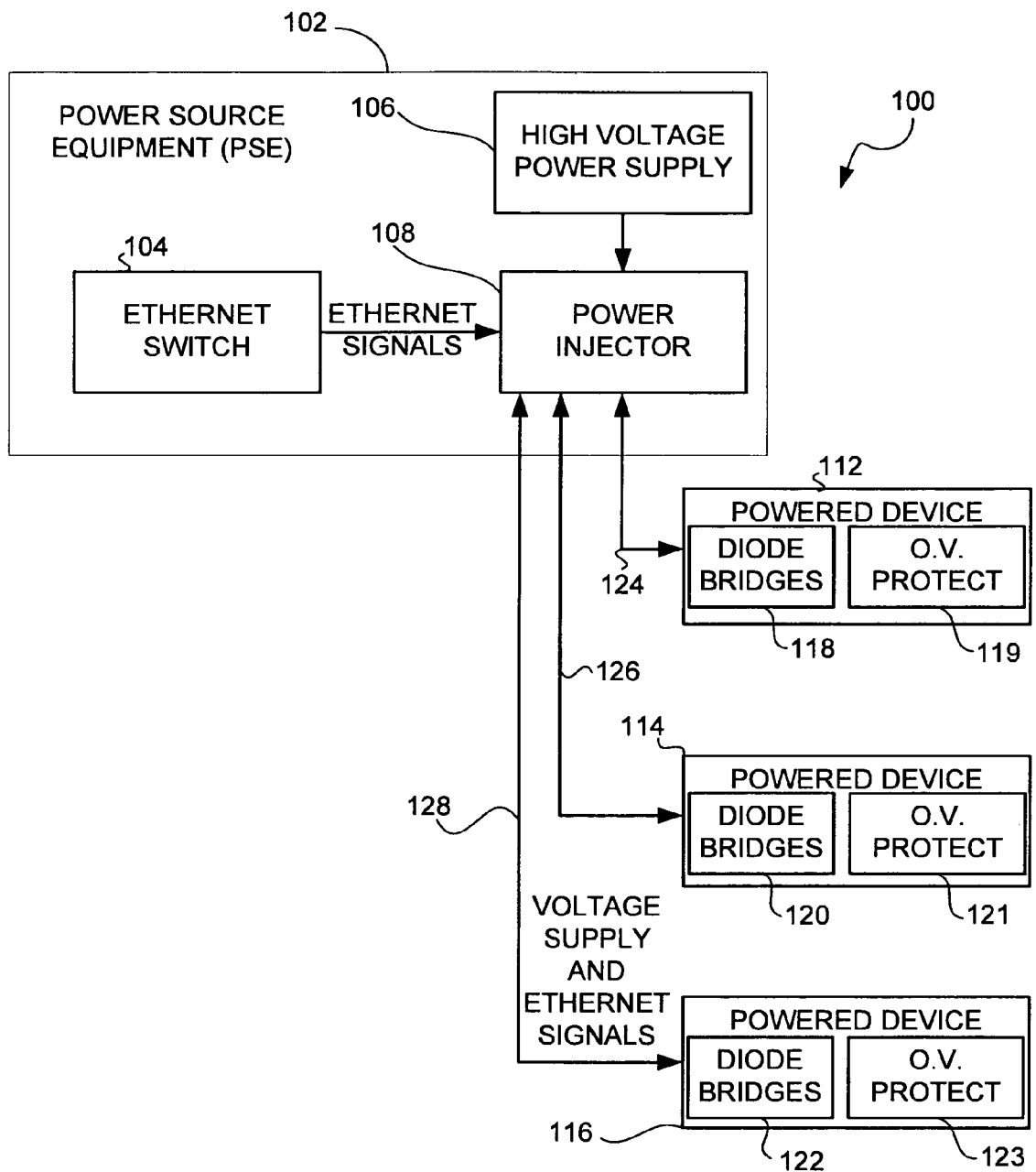
FIG. 1 is a block diagram of a particular illustrative embodiment of a Power over Ethernet (PoE) system.

FIG. 1 is a block diagram of system 100 with a power over Ethernet (PoE) power source equipment (PSE) device 102 and powered devices. In this particular implementation, the PSE device 102 includes an Ethernet switch 104, a high voltage power supply 106, and a PoE injector 108. The system 100 also includes PoE powered devices (PDs) 112, 114 and 116 with respective diode bridges 118, 120, and 122 and with respective over-voltage protection elements 119, 121, and 123. The over-voltage protection elements 119, 121 and 123 may protect against over-voltage fault conditions, transient conditions, and the like, and may be referred to as transient protection elements or power protection elements. The PSE device 102 is communicatively coupled to the PDS 112, 114, and 116 via twisted pair cabling 124, 126, and 128. In general, the system 100 may also include network devices (not shown) that are not adapted for PoE, which may draw power from a separate power supply, such as an electrical wall plug.

The high voltage power supply 106 provides a supply voltage to the power injector 108. The power injector receives Ethernet signals from the Ethernet switch 104 and places the Ethernet signals and at least a portion of the supply voltage onto Ethernet cables 124, 126 and 128. The PSE 102 can power a number of PDs depending on the specific implementation. Each powered device 112, 114 and 116 may include one or more diode bridges 118, 120 and 122 respectively. In general, in many applications, such as telephony and PoE, due to wiring uncertainties, the polarity of the input supply voltage at the PD cannot be guaranteed. The diode bridges 118, 120 and 122 provide that the correct voltage polarity is applied to load electronics within the PD or to electronic devices attached to the PD.

In general, the term "powered device" and "PD," as used herein, refers to a device adapted to receive a power supply and to receive data from the same cable or wiring. In the embodiment shown, the PDs 112, 114 and 116 are adapted to operate within a PoE environment. Alternatively, the power sourcing equipment (PSE) may be any source adapted to transmit power and data over common wiring. For example, the PSE 102 may be an electrical power transmission station adapted for high speed broadband data transmissions over electrical transmission lines. In such an instance, the data transmissions may use data packets, may use data frames, may use other data protocols, or any combination thereof. Nevertheless, the PDs 112, 114, and 116 may be adapted to communicate using an appropriate protocol, and the active diode bridges 118, 120 and 122 can be used to provide low loss rectification of the power supply for the PDs 112, 114, and 116, respectively.

The over-voltage protection elements 119, 121, and 123 are adapted to detect an electrical characteristic of the rectified voltage supply from the diode bridges 118, 120 and 122, respectively. When the rectified voltage supply exceeds a threshold voltage level, the over-voltage protection elements 119, 121, and 123 are activated to limit the rectified voltage supply level. In one embodiment, the over-voltage protection elements 119, 121, and 123 shunt excess voltage and current between the rectified voltage supply rails (such as supply voltage terminals 238 and 240 in FIG. 2). In another embodiment, the over-voltage protection elements 119, 121, and 123 shut down associated circuitry, such as load circuitry, a power regulator, control logic, and the like, to prevent a damage to such circuitry. In general, the turn-on voltage of the over-voltage protection element 119, 121, and 123 may be utilized as a threshold, and high voltage transients that exceed the threshold voltage level may trigger the over-voltage protection elements 119, 121, and 123 to shunt the excess voltage and current between the rectified voltage supply rails and to issue a fault protection signal to deactivate, to shut off, or to substantially reduce power to the associated circuitry.

Figure 2:
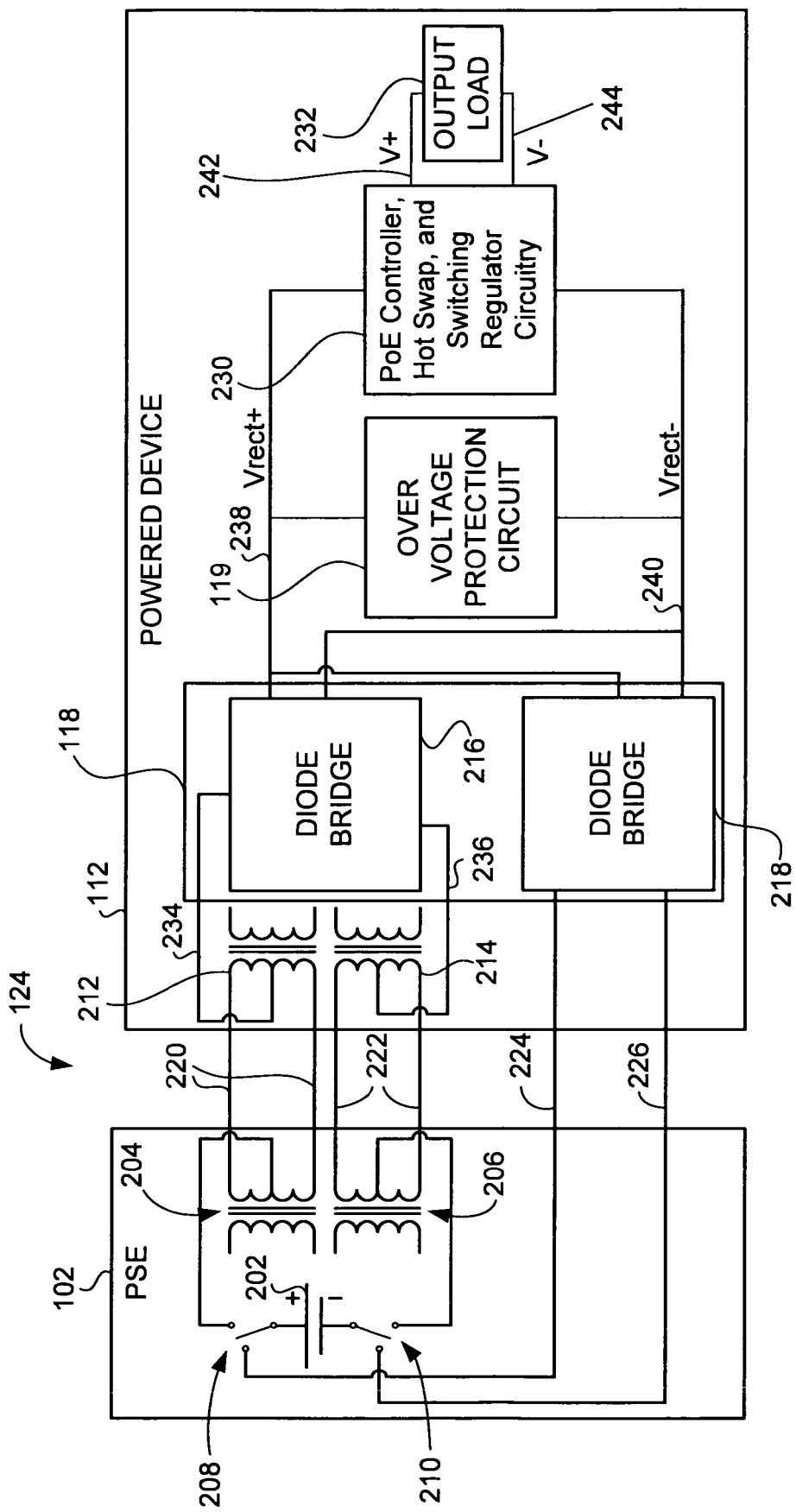
FIG. 2 is an example of PoE wiring interconnections between power source equipment and a powered device (PD).

FIG. 2 is a block diagram illustrating a wire interconnection between an illustrative PSE device 102 and an illustrative PD 112. The PSE device 102 and the PD 112 are connected via Ethernet cable 124. In general, the Ethernet cable 124 is comprised of a plurality of wire pairs 220, 222, 224, and 226. The IEEE 802.3AF standard defines a role for each of the wire pairs 220, 222, 224 and 226 within the twisted pair wiring 124. Two of the wire pairs 220 and 222 carry Ethernet packets, and two of the wire pairs 224 and 226 are spares.

The PSE device 102 includes a power supply 202, which is used to power windings of the transformers 204 and 206, which place power onto the wire pairs 220 and 220 of the twisted pair cable 124. In this implementation, the PSE 102 is coupled to the transformers 204 and 206 through switches 208 and 210. The switches 208 and 210 may couple the power supply 202 to the transformers 204 and 206 or may couple the power supply 202 directly to wire pairs 224 and 226 (sometimes referred to as the spare pare). At least one of the wire pairs 220, 232, 224, and 226 may carry power, data, or any combination thereof.

The PD 112 includes diode bridges 118, transformers 212 and 214, an over-voltage protection circuit 119, and a PoE controller/hot swap/switching regulator circuit 230, which provides power to an output load 232. The diode bridges 118 include diode bridge 216 and diode bridge 218. Each of the diode bridges 216 and 218 include two inputs for receiving an input voltage supply and two outputs for providing a rectified voltage supply ($V_{rect}+$ and $V_{rect}-$) to the input voltage supply terminals 238 and 240. In general, the transformers 212 and 214 are connected to wire pairs 220 and 222 to receive data signals and power from the PSE 102. The transformers 212 and 214 are connected via their respective center taps 234 and 236 to the inputs of the diode bridge 216. By connecting to the respective center taps 234 and 236, data can be extracted from the signal at a common mode of the transformers 212 and 214.

The wire pairs 224 and 226 are connected to the inputs of the diode bridge 218. The outputs of the diode bridges 216 and 218 are connected to input voltage supply terminals 238 and 240. The diode bridges 216 and 218 provide a positive rectified voltage (Vrect+) onto the input voltage supply terminal 238 and a negative rectified voltage (Vrect−) onto the input voltage supply terminal 240. The over-voltage protection circuit 119 is connected between the input voltage supply terminals 238 and 240, to detect an over-voltage condition and to protect the PoE controller/hot swap/switching regulator circuit 230 as well as the output load 232 from over-voltage faults. Additionally, the PoE controller/hot swap/switching regulator circuit 230 is connected between the input voltage supply terminals 238 and 240. When the supply voltage levels on the input voltage supply terminals 238 and 240 are within an expected voltage supply range (such as between 36 and 57 volts), the PoE controller/hot swap/circuit 230 provides a DC voltage supply to the output load 232 via the supply terminals 242 and 244.

During operation, two of the wire pairs, such as wire pairs 220 and 222 or wire pairs 224 and 226, may be used to provide an input supply voltage to the PD 112. It is typically not known which of the pairs of wires will be used. Consequently, the PD 112 is adapted to receive a supply voltage from either set of wire pairs.

In one embodiment, the diode bridges 216 and 218 may include diode bypass elements (diode bypass switches) placed in parallel with at least one of the diodes within each of the diode bridges 216 and 218. Under certain conditions, a selected one of the diode bypass elements within one of the diode bridges 216 and 218 may be activated to provide a current path to bypass the associated diode within the respective diode bridge 216 or 218. The diode bypass element reduces the voltage consumption within the diode bridge by routing current through the bypass element to bypass the associated diode. From a power perspective, the diode bypass element looks like a low value resistor when it is active. The bypass current flows through the diode bypass element as long as the voltage drop across the bypass element is less than a turn on voltage of the diode. In one embodiment, the diode bypass element is a field effect transistor (FET). Since an active FET can sink a large amount of current at low voltage, the diode can remain inactive. By applying a transistor bypass to a full diode bridge 208 or 210 to bypass selected diodes within the diode bridge, the overall power consumption of the diode bridge is reduced, thereby reducing the overall load and improving the power efficiency of the PD 112. Alternatively, the diode bypass element may be a bipolar transistor.

In general, if a rectified voltage level provided by the diode bridge 216 or 218 exceeds a predetermined threshold level, the over-voltage protection circuit 119 is activated to shunt excess voltage between the input voltage supply terminals 238 and 240. Additionally, the over-voltage protection circuit 119 may be adapted to generate an over-voltage fault signal to deactivate, to shut down, or to substantially reduce a power supply to the PoE controller/hot swap/switching regulator circuit 230 as well as the output load 232.

Figure 3:
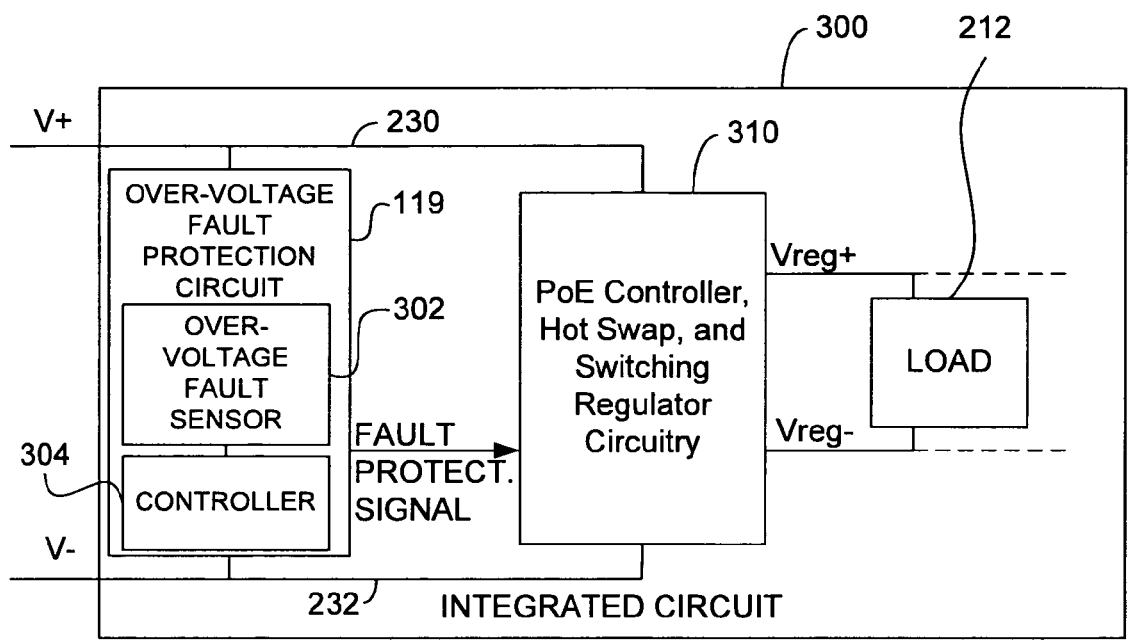
FIG. 3 is a block diagram of a portion of an integrated circuit that includes an integrated over-voltage fault protection circuit within a PD.

FIG. 3 is a block diagram of a portion of an integrated circuit 300 that includes an integrated over-voltage fault protection circuit 119 that may be used within a PD, such as PD 112 in FIG. 1. The integrated circuit 300 includes the over-voltage fault protection circuit 119, a controller, hot swap, and switching regulator 230, and an output load 232. The over-voltage fault protection circuit 119 may include an over-voltage fault sensor 302 and a controller 304. The over-voltage fault protection circuit 119 is connected to the supply voltage terminal 238 and to the supply voltage terminal 240 and is communicatively coupled to the controller, hot swap, and switching regulator 230. The controller, hot swap, and switching regulator 230 is connected to the power supply voltage terminals 238 and 240 and provides at least one regulated voltage supply for driving an output load 232, which may include low voltage rated circuit components.

It should be understood that the supply voltage terminal 238 may have a first voltage potential and the supply voltage terminal 240 may have a second voltage potential. The difference between the first and the second voltage potentials defines an input voltage to the controller, hot swap, and switching regulator 230 and to the over-voltage fault protection circuit 119.

The controller 304 of the over-voltage fault protection circuit 119 monitors the supply voltage terminals 238 and 240 for an over-voltage condition using the over-voltage fault sensor 302. When an over-voltage condition is detected, the over-voltage fault protection circuit 119 shunts the excess voltage between the supply voltage terminals 238 and 240. Additionally, the controller 304 generates a fault protection signal to the controller, hot swap, and switching regulator 230. The fault protection signal may include a shut off signal to deactivate or substantially reduce a power supply to the controller, hot swap, and switching regulator 230, so that components of the controller, hot swap, and switching regulator 230, as well as the output load 232 that is powered from the regulated voltage supply of the controller, hot swap, and switching regulator 230, are protected from the over-voltage condition. In one embodiment, the shut off signal may include an abrupt decrease in an input supply voltage level on the supply voltage terminals 238 and 240, which may be caused by activation of the over-voltage fault protection circuit 119 and which may be detected by the controller, hot swap, and switching regulator 230.

For example, in one particular illustrative embodiment, the controller, hot swap, and switching regulator 230 may include switches that are active when the supply voltage of the supply voltage terminals 238 and 240 is appropriate for operation of the controller, hot swap, and switching regulator 230. The over-voltage fault protection signal from the controller 304 can deactivate the switches when an over-voltage condition is detected.

Figure 4:
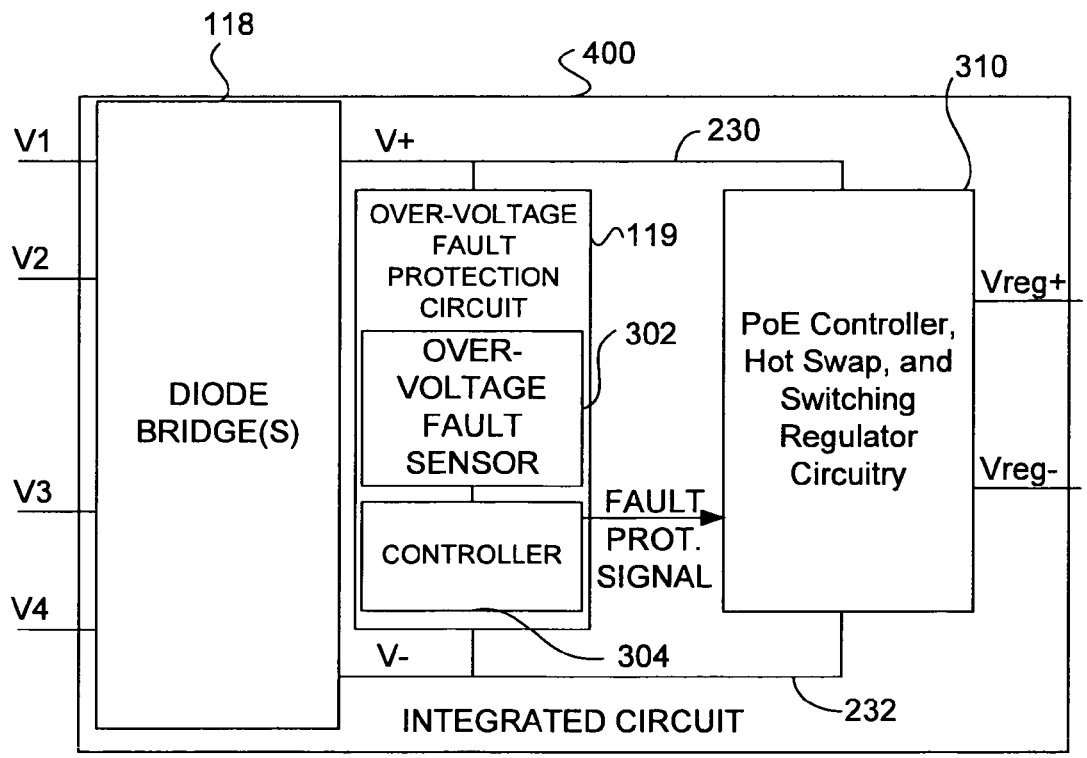
FIG. 4 is a block diagram of a portion of an integrated circuit that includes diode bridges and an integrated over-voltage fault protection circuit within a PD.

FIG. 4 is a block diagram of a particular embodiment of a portion of an integrated circuit 400 that includes diode bridges 118 and an integrated over-voltage fault protection circuit 119 that can be used within a PD. The integrated circuit 400 also includes the controller, hot swap, and switching regulator 230. The diode bridges 118 are connected to input supply terminals (such as wire pairs 222 and 224 in FIG. 2) and to supply voltage terminals 238 and 240. The diode bridges 118 receive an input voltage supply from the input supply terminals and convert the input voltage supply to a rectified voltage supply. The diode bridges 118 drive the input voltage supply onto the supply voltage terminals 238 and 240.

The over-voltage fault protection circuit 119 is connected to the supply voltage terminals 238 and 240. The controller 304 monitors a voltage level of the supply voltage terminals 238 and 240 using the over-voltage fault sensor 302. When the voltage level exceeds an over-voltage threshold, the over-voltage protection circuit 119 shunts the excess voltage between the supply voltage terminals 238 and 240. Additionally, the over-voltage protection circuit 119 may generate an over-voltage fault protection signal to the controller, hot swap, and switching regulator 230.

The controller, hot swap, and switching regulator 230 is connected to the supply voltage terminals 238 and 240 to receive the rectified input voltage supply. The controller, hot swap, and switching regulator 230 may generate a regulated supply voltage (Vreg+ and Vreg−) to drive a circuit load. The regulated supply voltage may have a lower voltage potential than the rectified input voltage supply on supply voltage terminals 238 and 240.

In general, though the controller 304 and the over-voltage fault sensor 302 are illustrated as part of the over-voltage protection circuit 119, it should be understood that the controller 304 and the over-voltage fault sensor 302 may be included as part of the power regulator circuit 230. Alternatively, the controller 304 and the over-voltage fault sensor 302 may be separate circuit components of the integrated circuit (such as 300 or 400 in FIGS. 3 and 4, respectively). Alternatively, the controller 304 and the over-voltage fault sensor 302 may be separately arranged on the integrated circuit or included as part of other components of the integrated circuit 400, depending on the particular implementation. In such an instance, the over-voltage protection circuit 119 may include shunt circuitry to shunt the excess voltage between the supply voltage terminals 238 and 240, and the controller 304 monitors the voltage level for over-voltage conditions.

Figure 5:
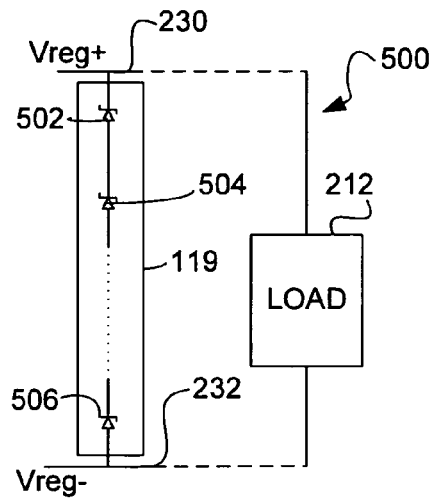
FIG. 5 is a circuit diagram of an embodiment of an over-voltage protection circuit within a PD.

FIG. 5 is a circuit diagram of an embodiment of an over-voltage protection circuit within a portion of an integrated circuit 500 for use within a PD. The integrated circuit 500 includes an over-voltage protection circuit 119 and an output load 232. The over-voltage protection circuit 119 and the output load 232 are both connected between the supply voltage terminals 238 and 240. The over-voltage protection circuit 119 includes a plurality of zener diodes 502, 504, and 506 arranged in series (a zener stack) between the supply voltage terminals 238 and 240. Each zener diode 502, 504, and 506 has a characteristic breakdown voltage. The sum of the breakdown voltages defines a trigger or threshold voltage level for the over-voltage protection circuit 119. When the input supply voltage potential between the supply voltage terminals 238 and 240 exceeds the threshold voltage level, the zener diodes 502, 504, and 506 breakdown and shunt the excess voltage between the supply voltage terminals 238 and 240.

When the over-voltage fault event is finished, the over-voltage protection fault circuit 119 stops shunting the excess voltage and the circuit 500 returns to a normal operating mode. During this recovery phase, the input supply voltage on the supply voltage terminals 238 and 240 falls below the over-voltage threshold defined by the sum of the characteristic breakdown voltages of the zener diodes 502-506, the zener diodes 502-506 turn off and stop conducting. The input supply voltage rises to the operating input level, and downstream circuitry, such as a voltage regulator or the output load 232, receives the input supply voltage.

Figure 6:
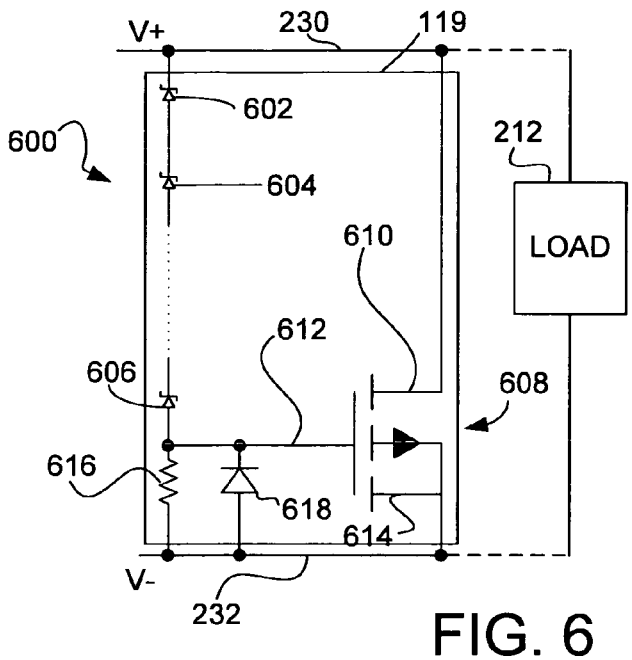
FIG. 6 is a circuit diagram of another embodiment of an over-voltage protection circuit within a PD.

FIG. 6 is a circuit diagram of another particular embodiment of an integrated circuit 600 with an over-voltage protection circuit for use within a PD. The integrated circuit 600 includes an over-voltage protection circuit 119 and an output load 232. The over-voltage protection circuit 119 includes a plurality of zener diodes 602, 604, and 606, an N-channel insulated gate field effect transistor 608, a resistor 616, and a diode 618. The insulated gate field effect transistor 608 can be, for example, a metal oxide semiconductor (MOS) field effect transistor, a poly-oxide field effect transistor, or any other suitable type of field effect transistor. The transistor 608 includes a drain terminal 610 connected to the supply voltage terminal 238, a gate terminal 612, and a source drain terminal connected to the supply voltage terminal 240. A diode 618 includes a cathode terminal connected to the supply voltage terminal 240 and an anode terminal connected to the gate terminal 612. A resistor 616 is connected to the supply voltage terminal 240 and to the gate terminal 612. The zener diodes 602, 604, and 606 of a zener stack are connected in series between the gate terminal 612 and the voltage supply terminal 238.

In general, any number of zener diodes, such as the illustrated zener diodes 602-606, can be used. Each zener diode 602-606 includes a characteristic breakdown voltage. The sum of the breakdown voltages of each of the zener diodes defines an over-voltage threshold. For example, if the threshold over-voltage condition is 57 volts, nine zener diodes, having characteristic breakdown voltages of 6.4 volts each, can be arranged in series to define an over-voltage threshold of approximately 57.6 volts. If the differential voltage between the voltage supply terminals 238 and 240 exceeds 57.6 volts, the nine zener diodes breakdown and begin to conduct current between the supply voltage terminals 238 and 240. The voltage increases at the gate terminal 612 of the field effect transistor 608, which switches on and shunts the input supply voltage between the voltage supply terminals 238 and 240.

When the over-voltage fault event is finished, the over-voltage protection fault circuit 119 stops shunting the excess voltage and the circuit 600 returns to a normal operating mode. During this recovery phase, the input supply voltage on the supply voltage terminals 238 and 240 falls below the over-voltage threshold defined by the sum of the characteristic breakdown voltages of the zener diodes, the zener diodes turn off and stop conducting. The input voltage at the gate terminal 612 falls below the turn on voltage of the transistor 608, and the transistor turns off. The input supply voltage rises to the operating input level, and downstream circuitry, such as a voltage regulator or the output load 232, receives the input supply voltage.

Figure 7:
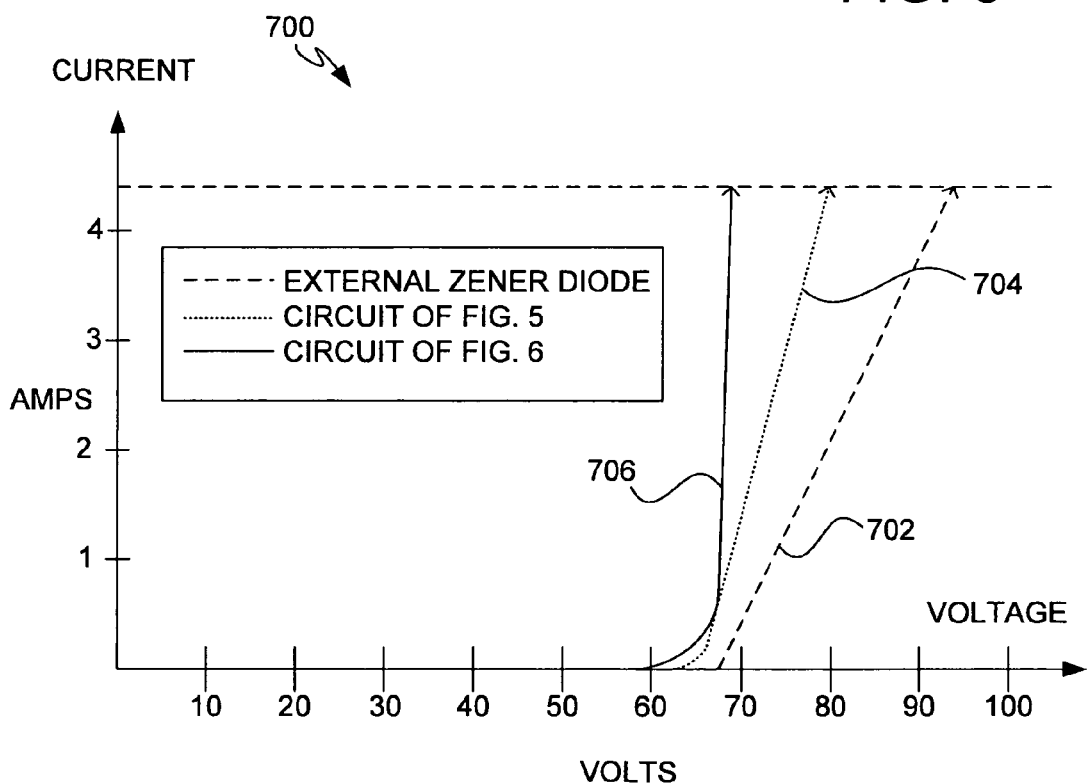
FIG. 7 is a graph that illustrates voltage versus current comparing a traditional zener diode protection device to the circuits of FIGS. 5 and 6.

FIG. 7 is a graph 700 that illustrates voltage versus current comparing a traditional zener diode protection device to the circuits of FIGS. 5 and 6. In conventional over-voltage protect device, a large zener diode may be connected between the supply voltage terminals external to the integrated circuitry. The graph line 702 illustrates such a conventional, external zener diode. The large external diode of line 702 typically has a large variance in breakdown voltages, so the turn on voltage may be significantly higher than the threshold over-voltage level. As shown, the large external diode of line 702 turns on at a differential voltage of approximately 67 volts and clamps the input supply voltage to approximately less than 94 volts for a 4.3 A transient current.

The graph line 704 illustrates a voltage clamp that may be provided by the over-voltage protection circuit arrangement of FIG. 5. The breakdown voltage for each diode is lower and the margin of error in the breakdown voltage is also significantly less. Thus, the over-voltage protection circuit begins to conduct at just over 57 volts and clamps the input supply voltage to approximately less than 80 volts for a 4.3 A transient current.

The graph line 706 illustrates a voltage clamp provided by the over-voltage protection circuit arrangement of FIG. 6. As in the arrangement of FIG. 5, the plurality of diodes provide a more precise turn-on voltage than the conventional, large, external zener diode. Thus, the over-voltage protection circuit of FIG. 6 turns on at around 58 volts and clamps the input supply voltage to approximately 67 volts for a 4.3 A transient current.

Figure 8:
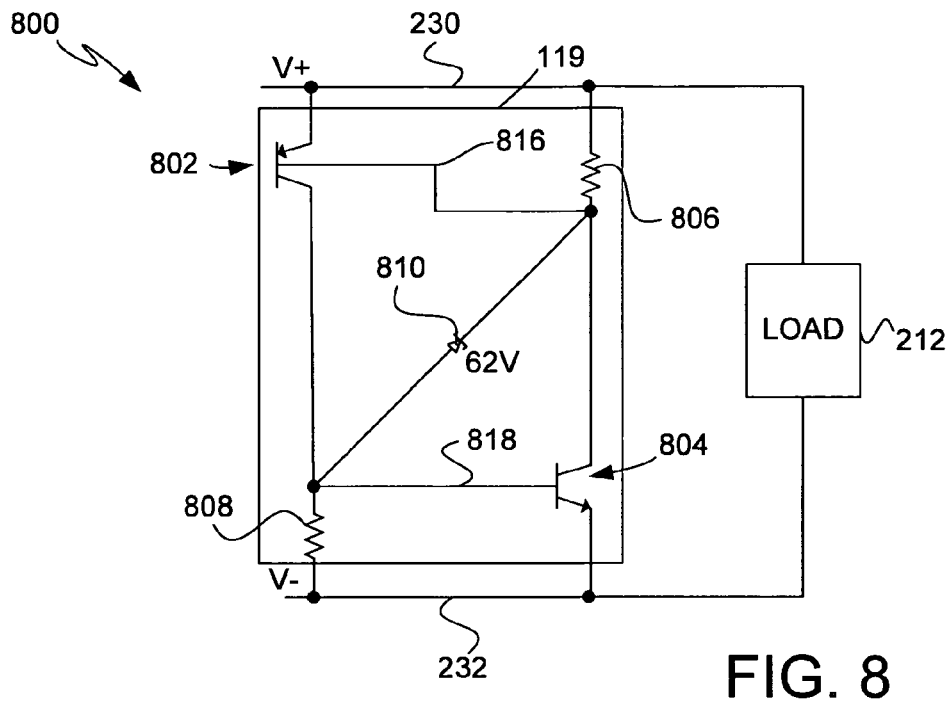
FIG. 8 is a circuit diagram of another embodiment of an over-voltage protection circuit within a PD.
Figure 9:
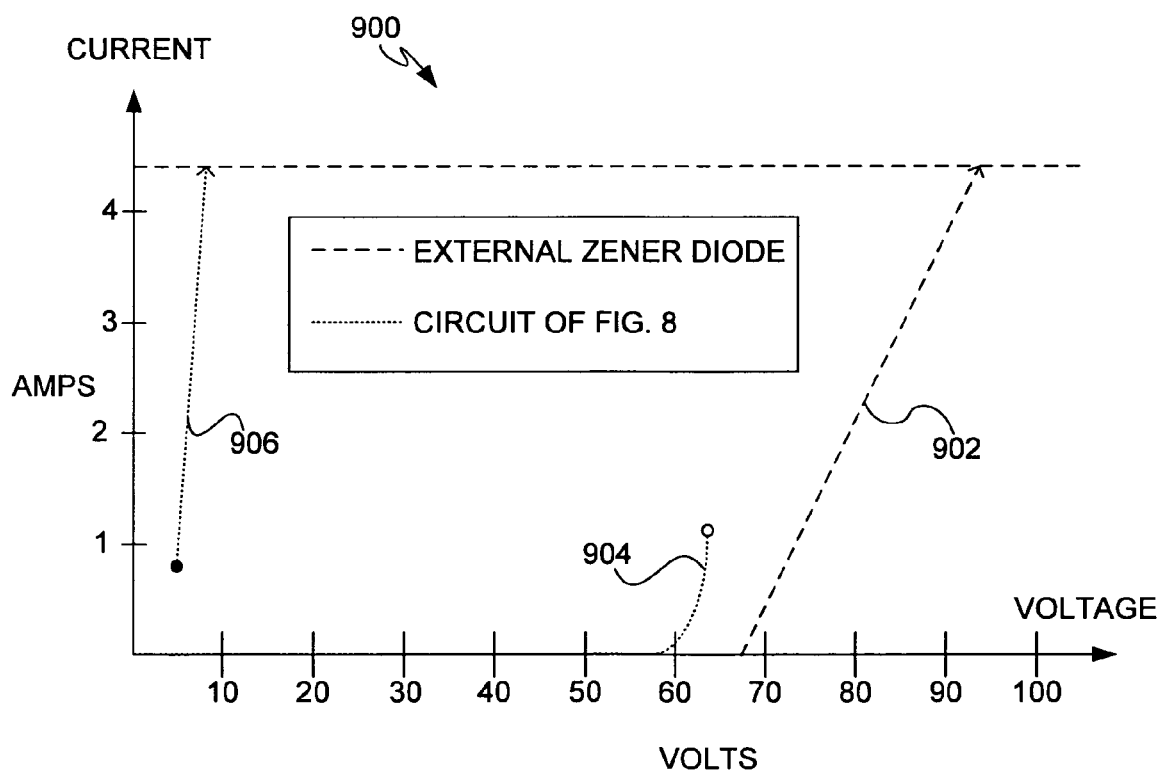
FIG. 9 is a graph illustrating voltage versus current comparing a traditional zener diode protection device to the circuit of FIG. 8.

FIG. 8 is a circuit diagram of another particular embodiment of a portion of an integrated circuit 800 with an over-voltage protection circuit 119 for use within a PD. The over-voltage protection circuit 119 is a voltage-triggered silicon controlled regulator (SCR). The over-voltage protection circuit 119 includes a P-channel bipolar junction transistor 802, an N-channel bipolar junction transistor 804, resistors 806 and 808, and a zener diode circuit 810. The transistor 802 includes a drain terminal connected to the input supply terminal 238, a gate terminal, and a source terminal. The transistor 804 includes a drain terminal connected to the gate terminal of the transistor 802, a gate terminal connected to the source terminal of the transistor 802, and a source terminal that is connected to the voltage supply terminal 240. The resistor 806 has a first terminal connected to the voltage supply terminal 238 and a second terminal connected to the gate terminal of the transistor 802. The resistor 808 has a first terminal connected to the gate terminal of the transistor 804 and a second terminal connected to the voltage supply terminal 240. The zener diode circuit 810 includes a cathode terminal connected to the source of the transistor 802 and an anode terminal connected to the drain terminal of the transistor 804. The output load 232 or a regulator circuit can be connected between the voltage supply terminals 238 and 240 in parallel with the over-voltage protection circuit 119.

FIG. 8 is a circuit diagram of another particular embodiment of a portion of an integrated circuit 800 with an over-voltage protection circuit 119 for use within a PD. The over-voltage protection circuit 119 is a voltage-triggered silicon controlled regulator (SCR). The over-voltage protection circuit 119 includes a P-channel bipolar junction transistor 802, an N-channel bipolar junction transistor 804, resistors 806 and 808, and a zener diode circuit 810. The transistor 802 includes an emitter terminal connected to the input supply terminal 238, a base terminal, and a collector terminal. The transistor 804 includes a collector terminal connected to the base terminal of the transistor 802, a base terminal connected to the collector terminal of the transistor 802, and an emitter terminal that is connected to the voltage supply terminal 240. The resistor 806 has a first terminal connected to the voltage supply terminal 238 and a second terminal connected to the base terminal of the transistor 802. The resistor 808 has a first terminal connected to the base terminal of the transistor 804 and a second terminal connected to the voltage supply terminal 240. The zener diode circuit 810 includes a cathode terminal connected to the collector terminal of the transistor 802 and an anode terminal connected to the collector terminal of the transistor 804. The output load 232 or a regulator circuit can be connected between the voltage supply terminals 238 and 240 in parallel with the over-voltage protection circuit 119.

In general, the diode circuit 810 defines an over-voltage threshold for the over-voltage protection circuit 119. When a voltage differential between the input supply terminals exceeds the characteristic breakdown voltage of the diode circuit 810, the diode circuit 810 begins conducting. A voltage at the base terminal of the transistor 804 increases and activates the transistor 804, which pulls down the voltage at the base terminal of the transistor 802, activating the transistor 802, thereby shunting the current between the voltage supply terminals 238 and 240. In general, the transistors 802 and 804 turn on asynchronously, resulting in an abrupt change in the voltage differential between the voltage supply terminals 238 and 240 at the point where both transistors 802 and 804 become active.

It should be understood that the voltage and current levels described above are illustrative only. Other voltage and current levels may also be achieved by adjusting the breakdown voltage of the diode circuit, for example. A lower breakdown voltage provides for second and third modes of operation at a lower voltage level. For example, if the breakdown voltage of the diode circuit is at approximately 30 volts, then the second mode of operation would be greater than approximately 30 volts. Similarly, a higher breakdown voltage provides for a higher voltage level at the second and third modes of operation.

When the over-voltage fault event is finished, the over-voltage protection fault circuit 119 stops shunting the excess voltage and the circuit 800 returns to a normal operating mode. During this recovery phase, when the supply voltage on the voltage supply terminals 238 and 240 falls below the over-voltage threshold of the diode circuit 810, the diode circuit 810 turns off, causing the voltage to decrease at the gate terminal of transistor 804 and to increase rapidly at the gate terminal of the transistor 802. The transistor 802 turns off in response to the increased voltage at its gate terminal, and the voltage level at the gate terminal of the transistor 804 decreases rapidly, turning off the transistor 804. The supply voltage on the voltage supply terminals 238 and 240 is allowed to drive the output load 232.

When the over-voltage fault event is finished, the over-voltage protection fault circuit 119 stops shunting the excess voltage and the circuit 800 returns to a normal operating mode. During this recovery phase, when the supply voltage on the voltage supply terminals 238 and 240 falls below the over-voltage threshold of the diode circuit 810, the diode circuit 810 turns off, causing the voltage to decrease at the base terminal of transistor 804 and to increase rapidly at the base terminal of the transistor 802. The transistor 802 turns off in response to the increased voltage at its base terminal, and the voltage level at the base terminal of the transistor 804 decreases rapidly, turning off the transistor 804. The supply voltage on the voltage supply terminals 238 and 240 is allowed to drive the output load 232.

The over-voltage protection circuit 119 reduces the transient voltage seen by the PD and the PD-coupled circuitry. The power dissipated in the transistors 802 and 804 is much lower than is dissipated in a large external zener diode, so the reliability and robustness of the protection is improved. In general, in PD devices, there may be a large capacitor in the PD between a hot swap switch (not shown) and the circuit load. This capacitor may be discharged through the hot swap switch, which is reverse biased under the over-voltage condition. A controller (such as that shown in FIGS. 2 and 3) may be used to shut down the hot swap switch to prevent such a discharge.

It should be understood that the diode circuit 810 defines a turn-on threshold for the transistors 802 and 804, and that the resulting voltage at the gate terminals of the transistors 802 and 804 can be considered control signals. Alternatively, the transistors 802 and 804 could be activated by a control signal sent, for example, by a controller or other active circuit element upon detection of an over-voltage fault condition.

It should be understood that the diode circuit 810 defines a turn-on threshold for the transistors 802 and 804, and that the resulting voltage at the base terminals of the transistors 802 and 804 can be considered control signals. Alternatively, the transistors 802 and 804 could be activated by a control signal sent, for example, by a controller or other active circuit element upon detection of an over-voltage fault condition.

In contrast, the over-voltage protection circuit of FIG. 8 turns on at approximately 58 volts, and increases to a little over 60 volts up to approximately 1 A of current as illustrated by line 904. As the current continues to rise, the transistor 802 turns on and the voltage is clamped at a value of less than 10 volts for a 4.3 A transient current as illustrated by line 906.

Figure 10:
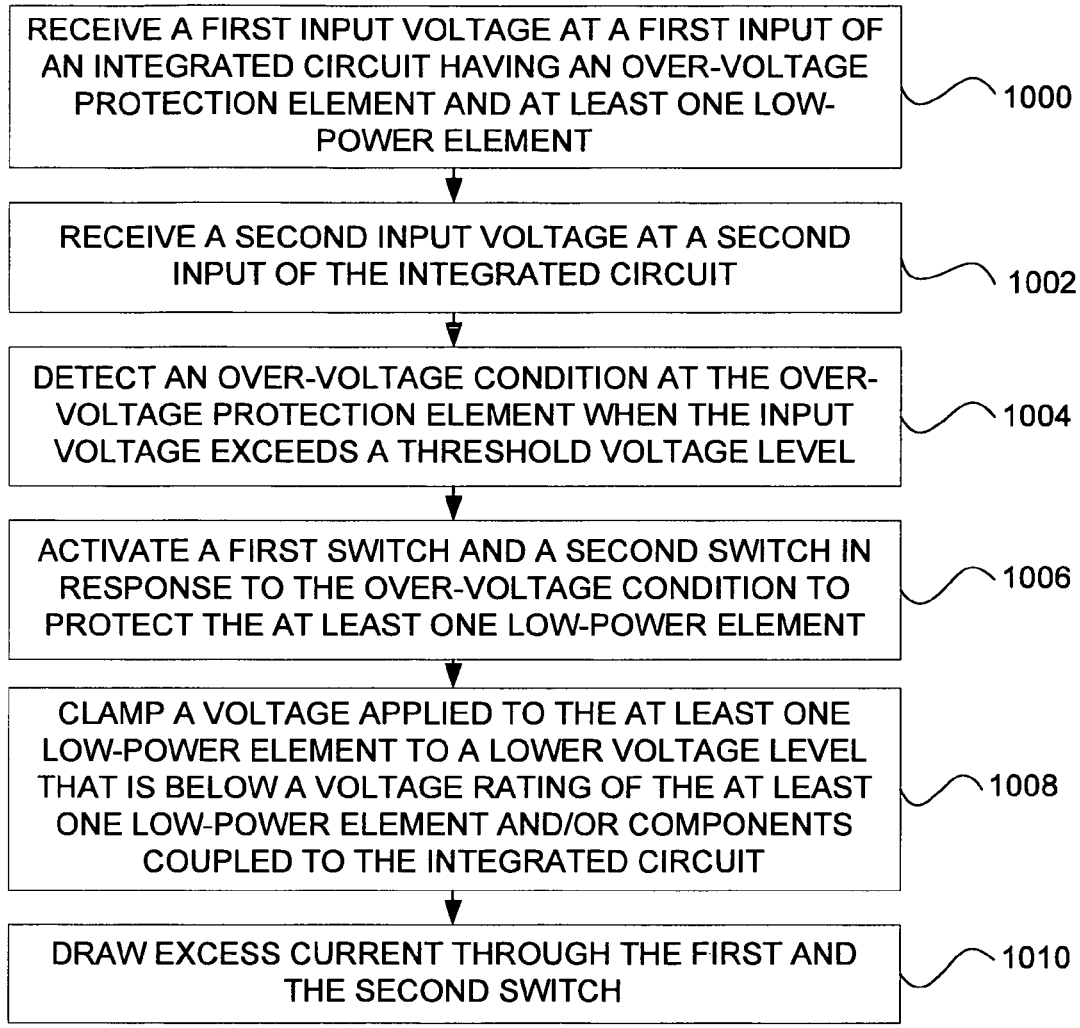
FIG. 10 is a flow diagram of a method of providing over-voltage fault protection in an integrated circuit.

FIG. 10 is a flow diagram of a method of providing over-voltage fault protection in an integrated circuit. An integrated circuit having a first over-voltage protection element and at least one low-power element receives a first input voltage at a first input (block 1000). The integrated circuit receives a second input voltage at a second input (block 1002). The over-voltage protection element detects an over-voltage condition when the input voltage exceeds a threshold voltage level (block 1004). The over-voltage protection element activates a first switch and a second switch in response to the over-voltage condition to protect the at least one low-power element (block 1006). The over-voltage protection element clamps a voltage applied to the at least one low-power element to a lower voltage level that is below a voltage rating of the at least one low-power element and/or that is below a voltage rating of components coupled to the integrated circuit (block 1008). The over-voltage protection circuit draws excess current through the first and the second switch (block 1010).

Figure 11:
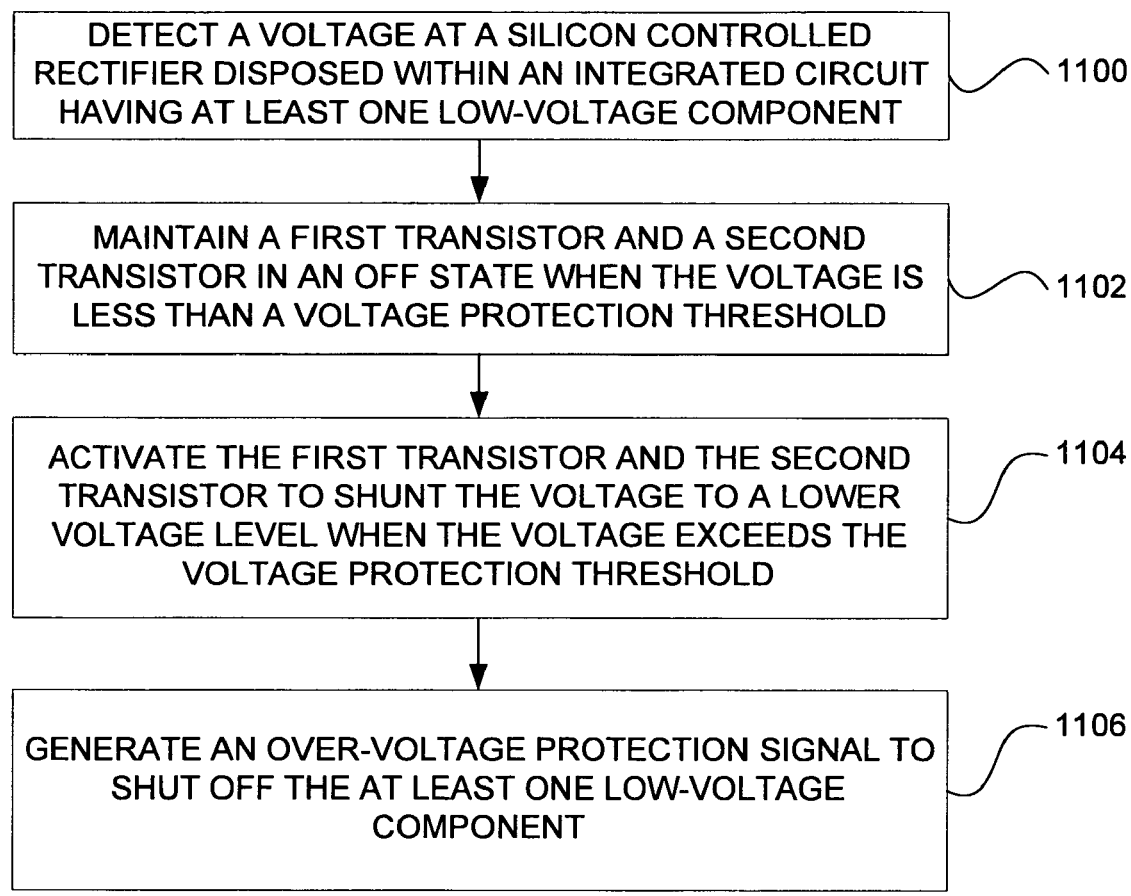
FIG. 11 is a flow diagram of an alternative method of providing over-voltage fault protection in an integrated circuit.

FIG. 11 is a flow diagram of an alternative method of providing over-voltage fault protection in an integrated circuit. An over-voltage protection circuit within an integrated circuit having at least one low-voltage component detects a voltage (block 1100). The over-voltage protection circuit maintains a first transistor and a second transistor in an off state when the voltage is less than a voltage protection threshold (block 1102). The over-voltage protection circuit activates the first transistor and the second transistor to clamp the voltage to a lower voltage level when the voltage exceeds the voltage protection threshold (block 1104). The over-voltage protection circuit generates an over-voltage protection signal to shut off the at least one low-voltage component (block 1106).

It should be understood that the at least one low-voltage component of the flow diagram of FIG. 11 and the low-power component of the flow diagram of FIG. 10 may be a circuit load, an LED, an oscillator, a voltage regulator, or any circuit component that could be damaged by exposure to an ESD event or other high voltage event.

In general, the over-voltage protection circuit 119 defines voltage handling capabilities of the device, such as the PD. The over-voltage protection circuit 119 described above can detect the turn on of the over-voltage detection circuit. Thus, the turn on can be used as a trigger to turn off or shut down power circuits, such as the regulator circuit, to prevent high power dissipation.

The over-voltage protection device can be implemented using a low impedance zener diode implemented by an active zener diode, such as a high voltage zener diode or a zener stack. In one embodiment, a high voltage transistor may be provided within a feedback loop, to lower the effective zener impedance and to clamp the voltage to a much lower voltage level during an over-voltage fault event.

It should be understood that the over-voltage protection circuit may be a transient suppressor circuit that is adapted to provide protection to the circuit from high voltage transients.

In general, though the embodiments described above have focused largely on PoE implementations, it should be understood that the over-voltage protection circuit or element may be utilized in other applications where power fault protection is desired. The above-described embodiments may be employed with other types of powered networks, where the power supply voltage cabling also carries data. For example, diode bridges may be used to rectify a voltage supply from a bus including power and data, and a power protection element may be utilized to shunt excess current and voltage between input supply terminals to provide fault protection to associated circuitry. In some embodiments, the wiring that couples the powered network to the powered device may include a plurality of individual wires, such as twisted pair cabling. In such instances, a pair of individual wires may carry both power and data. Alternatively, a first pair of the individual wires may carry data and a second pair of the individual wires may carry a supply voltage. In another embodiment, the wiring may include a power bus that carries both power and data. In another embodiment, the wiring may include a coaxial cable that carries both power and data.

Additionally, in the above-discussion, the over-voltage protection element has been described with respect to voltage potentials. However, it should be understood that the protection element may also be referred to as a power protection element, because power is a function of voltage and current. When activated, the power protection element limits the voltage and shunts current between the input supply terminals to protect load circuitry from transient high voltage and high current events.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A powered device comprising:
   a rectifier circuit having two inputs to receive an input voltage from a powered network and having two output terminals to provide a rectified power supply voltage in response to the input voltage;
   a logic circuit coupled between the two output terminals and adapted to receive data from the powered network, the logic circuit comprising a regulator to provide a regulated power supply to a load circuit; and
   a power protection element coupled between the two output terminals in parallel with the logic circuit, the power protection element to protect to the logic circuit from high power transients, the power protection element comprising a circuit including a zener diode having a breakdown voltage defining a threshold voltage level and including at least one switch coupled to the zener diode, wherein, in a first mode of operation, the power protection element presents a high impedance to the two output terminals, in a second mode of operation, the power protection element has a first power protection characteristic, and in a third mode of operation, the voltage protection element has a second power protection characteristic, wherein the power protection element is adapted to reduce the rectified power supply voltage at the logic circuit when an over-voltage condition is detected and to return to the first mode of operation when the over-voltage condition is finished.

2. The powered device of claim 1, wherein the powered network comprises a Power over Ethernet (PoE) network, and wherein the powered device is adapted to derive power from the PoE network.

3. The powered device of claim 1, wherein the powered network comprises an electrical power network, and wherein the powered device is adapted to receive power and data from the electrical power network.

4. The powered device of claim 1, wherein the power protection element further comprises active logic to generate a fault protection signal to the logic circuit to shut off the regulated power supply to the load circuit when in the third mode of operation.

5. The powered device of claim 1, wherein the power protection element comprises two switches adapted to activate asynchronously in response to a signal to clamp the rectified power supply voltage to a reduced level.

6. The powered device of claim 1, wherein the power protection element comprises a silicon controlled rectifier.

7. The powered device of claim 1, wherein the power protection element is at a higher voltage in the second mode of operation than in the third mode of operation.

8. The powered device of claim 7, wherein in the second mode of operation, the higher voltage is greater than 55 volts and wherein the power protection element has a current level less than one Ampere.

9. The powered device of claim 7, wherein in the third mode of operation, the power protection element has a voltage level less than ten volts and a current level greater than half an Ampere.

10. The powered device of claim 7, wherein the power protection element changes from the second mode of operation to the first mode of operation after a voltage level at the power protection element falls below the threshold voltage level.

11. The powered device of claim 1, wherein, in the third mode of operation, the at least one switch is activated as the zener diode conducts current, resulting in a lower impedance.

12. A method comprising:
receiving an input voltage from a cable coupled to a powered network at a first input terminal and a second input terminal of an integrated circuit, the integrated circuit including a voltage protection element and a voltage regulator circuit, the voltage protection element and the voltage regulator circuit coupled in parallel to the first and second input terminals;
rectifying the input voltage using a diode bridge;
detecting, via the voltage protection element, an over-voltage condition when the rectified voltage exceeds a threshold voltage;
reducing power to the voltage regulator circuit in response to detecting the over-voltage condition; and
sending a fault protection signal to the voltage regulator circuit to shut off power to a load circuit coupled to the voltage regulator circuit.

13. The method of claim 12, further comprising:
shunting a current between the first input terminal and the second input terminal after detecting the over-voltage condition.

14. The method of claim 13, further comprising clamping a voltage applied to the voltage regulator circuit to a voltage level that is below a voltage rating of a load circuit.

15. The method of claim 13, wherein shunting the current comprises drawing excess current through the voltage protection element.

16. The method of claim 12, wherein the powered network comprises one of a power over Ethernet (PoE) network or an electrical power network, and wherein the powered device is adapted to derive power and received data from the powered network.

17. The method of claim 12, wherein receiving the input voltage comprises:
receiving a first input voltage at the first input terminal of the integrated circuit; and
receiving a second input voltage at the second input terminal of the integrated circuit;
wherein the input voltage comprises a potential difference between the first input voltage and the second input voltage.

18. An integrated circuit of a powered device, the integrated circuit comprising:

a rectifier circuit having two input terminals to receive an input supply voltage from a powered network and having two output terminals to provide a rectified power supply voltage;
at least one circuit coupled between the two output terminals, the at least one circuit including a voltage regulator circuit to provide a regulated power supply to device circuitry; and
a voltage protection element coupled between the two output terminals in parallel with the voltage regulator circuit, the voltage protection element comprising a first switch and a zener diode adapted to break down in response to an over-voltage condition to activate the switch, wherein, in a first mode of operation, the voltage protection element presents a high impedance to the two output terminals, in a second mode of operation, the voltage protection element has a first over-voltage characteristic, and in a third mode of operation, the voltage protection element has a second over-voltage protection characteristic, wherein in the third mode of operation, the voltage protection element is adapted to reduce the rectified power supply voltage at the at least one circuit and to send a fault protection signal to the at least one circuit to turn off the regulated power supply to the device circuitry.

19. The integrated circuit of claim 18, wherein the switch is activated to clamp the input voltage to a voltage level that is below a voltage level of the rectified power supply voltage in response to detecting the over-voltage condition.

20. The integrated circuit of claim 18, wherein the voltage protection element comprises a second switch coupled to the zener diode, wherein the first and second switches are adapted to activate asynchronously in response detection of the over-voltage condition to clamp the supply voltage to a reduced voltage level.

21. The integrated circuit of claim 18, wherein the voltage protection element comprises a silicon controlled rectifier.

22. The integrated circuit of claim 18, wherein the voltage protection element further comprises active logic to generate the fault protection signal after detecting the over-voltage condition.

23. The integrated circuit of claim 18, wherein the fault protection signal comprises a shut down signal to deactivate the voltage regulator circuit.

24. The integrated circuit of claim 18, wherein the voltage protection element is at a higher voltage in the second mode of operation than in the third mode of operation.

25. The integrated circuit of claim 24, wherein in the second mode of operation, the higher voltage is greater than 55 volts and wherein the voltage protection element has a current level less than one Ampere.

26. The integrated circuit of claim 24, wherein in the third mode of operation, the voltage protection element has a voltage level less than ten volts and a current level greater than half an Ampere.

27. The integrated circuit of claim 24, wherein the over-voltage protection element changes from the second mode of operation to the first mode of operation after a voltage level at the voltage protection element falls below a threshold voltage level.

* * * * *